United States Patent [19]

Reese

[11] Patent Number: 4,997,214

[45] Date of Patent: Mar. 5, 1991

[54] TRANSITION FITTING

[75] Inventor: Anthony L. Reese, Bradford, Pa.

[73] Assignee: Dresser Industries, Inc., Dallas, Tex.

[21] Appl. No.: 281,451

[22] Filed: Dec. 8, 1988

[51] Int. Cl.[5] .............................................. F16L 55/00
[52] U.S. Cl. .................................... 285/174; 285/286; 285/382; 285/369; 285/21; 285/906; 228/173.4
[58] Field of Search ............ 285/174, 256, 382, 382.1, 285/382.2, 369, 322, 323, 286, 175, 369, 21, 906; 228/173.4

[56] References Cited

U.S. PATENT DOCUMENTS

| | | | |
|---|---|---|---|
| 2,013,217 | 9/1935 | Olmstead | 285/382.2 |
| 2,187,798 | 1/1940 | Texter | 285/286 |
| 3,220,753 | 11/1965 | Kasidas | 285/256 X |
| 3,287,802 | 11/1966 | Robinson et al. | 29/508 |
| 3,429,587 | 2/1969 | Kish | 285/382.2 X |
| 3,516,689 | 6/1970 | Binford | 285/369 X |
| 3,600,010 | 8/1971 | Downs et al. | 285/286 X |
| 3,612,584 | 10/1971 | Taylor | 285/174 |
| 3,915,480 | 10/1975 | Kish | 285/382 X |
| 3,997,199 | 12/1976 | Arnold | 285/322 |
| 4,094,537 | 6/1978 | Lyall | 285/47 |
| 4,243,254 | 1/1981 | Hill et al. | 285/242 |
| 4,345,785 | 8/1982 | Bradford | 285/286 X |
| 4,386,796 | 6/1983 | Lyall et al. | 285/31 |
| 4,466,640 | 8/1984 | Van Houtte | 285/382 X |
| 4,482,170 | 11/1984 | Jacobson | 285/256 X |
| 4,589,688 | 5/1986 | Johnson | 285/256 X |
| 4,635,972 | 1/1987 | Lyall | 285/242 |
| 4,693,499 | 9/1987 | Serve | 285/286 X |
| 4,786,088 | 11/1988 | Ziu | 285/138 |
| 4,793,638 | 12/1988 | Baldwin | 285/256 X |
| 4,807,910 | 2/1989 | Johansson | 285/292 X |

FOREIGN PATENT DOCUMENTS 0158602 11/1978 Netherlands ..................... 285/382

OTHER PUBLICATIONS

Dresser "700" Universal Posi-Hold Couplings color brochure, Form 782-700, Dresser Manufacturing Division, Dresser Industries, Inc.
Dresser "700" Posi-Hold Couplings and Fittings, black and white brochure, Form 700-185, REV. 386, Dresser Manufacturing Division, Dresser Industries, Inc.
Pp. 8 & 12 of Form 278-G, entitled "Dresser Couplings and Fittings for Joining Steel to Polyethylene Pipe or Tubing (SP) or Polyethylene to Polyethylene Pipe or Tubing (PP)" & Dresser Compression Ends and Lock Inserts.
Central Double O Seal Transition Fittings, Form CP 30, 4 pages, Central Plastics Company.
Presenting the LYCO Transition Fitting, 4 pages, R. W. Lyall & Company, Inc.

Primary Examiner—Dave W. Arola

[57] ABSTRACT

A preformed coupler for connecting plastic pipe to metal pipe comprises a convoluted tubular metal sleeve, a plastic tube extending part way into the metal sleeve, an annular gasket, and a retention means. The annular gasket, which encircles a portion of the plastic pipe, is compressed against the plastic pipe by the metal sleeve to form a fluid-tight seal. The retention means resists any effort to withdraw the tube from the sleeve. The free end of the metal sleeve can be telescoped over the end of the steel pipe to be joined, then the outer end of the plastic tube can be butt welded to the plastic pipe to be connected, and then the telescoped end of the sleeve can be welded to the metal pipe.

20 Claims, 4 Drawing Sheets

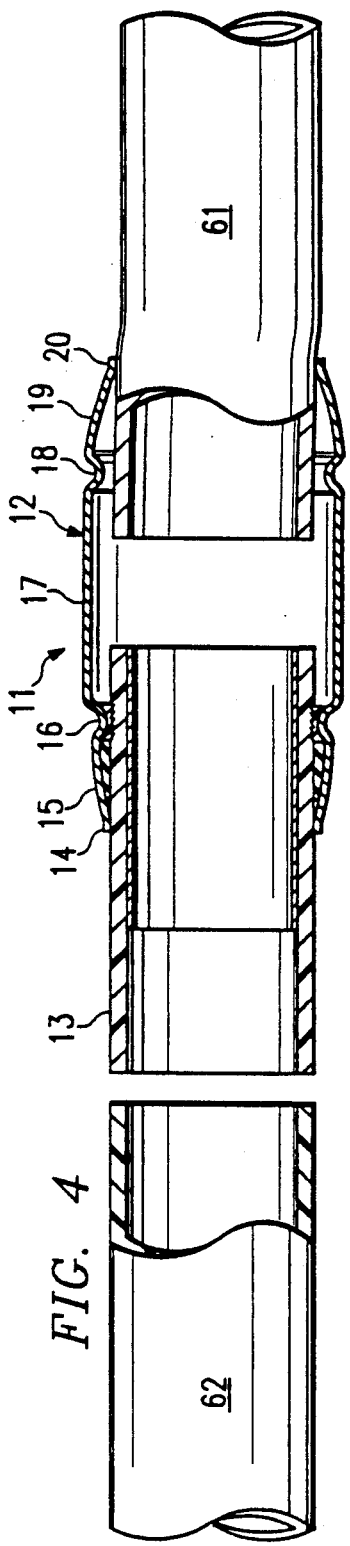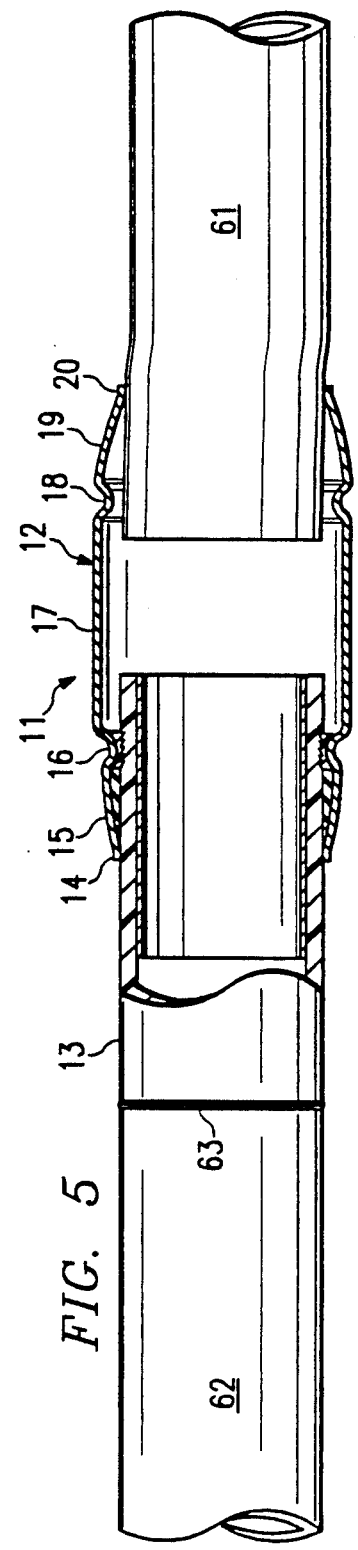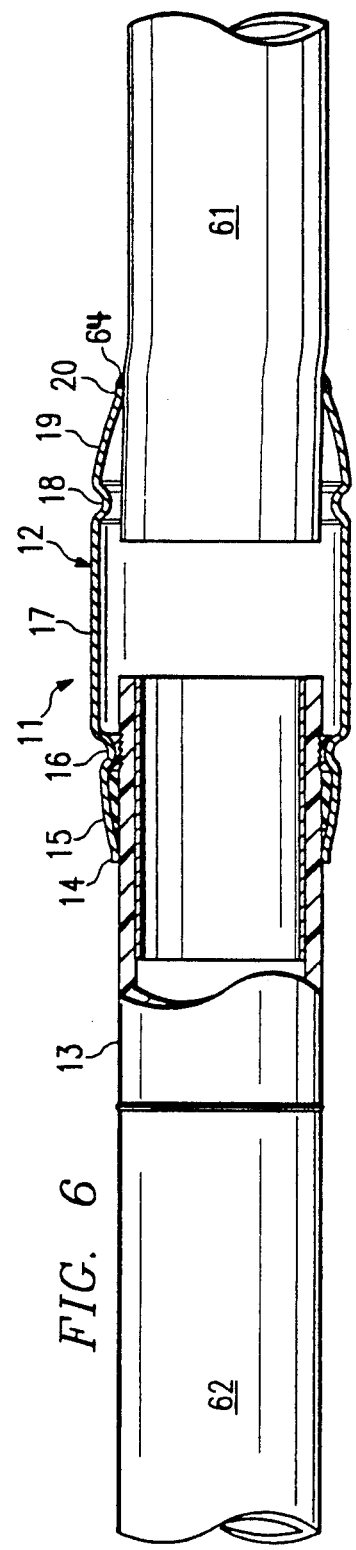

4,997,214

TRANSITION FITTING

FIELD OF THE INVENTION

This invention relates to couplings for formation of pipe joints, and in particular to a preformed coupling for joining plastic pipe to metal pipe. In one aspect, the invention relates to a preformed transition fitting having a plastic tube which can be butt welded to the end of plastic pipe and a tubular metal sleeve which can encompass and be welded to a metal pipe. In another aspect, the invention relates to a method for coupling a plastic pipe and a metal pipe in a field environment utilizing a transition fitting.

BACKGROUND OF THE INVENTION

While the use of mechanical couplings to form pipe joints is well known, most such couplings are used to join plastic pipe to plastic pipe or to join metal pipe to metal pipe. However, it is generally preferred to join plastic pipe to plastic pipe by heat fusion and to join metal pipe to metal pipe b welding. In recent years, the usage of plastic pipe, mainly polyethylene pipe, to repair, extend or replace underground gas distribution systems has increased substantially. In many instances, this has resulted in the need to connect a new plastic pipe to an existing metal pipe. The feasibility of joining pipes of the same material in field operations, such as underground gas distribution systems, with either mechanical couplings or fused/welded joints is well accepted. However, making a field installation of a fail safe transition from plastic pipe to steel pipe is sometimes difficult in view of the many adverse field conditions encountered.

Several types of transition fittings have been utilized commercially. Some of the mechanical couplers are designed to be used as transition fittings, but are configured such that one end thereof should only be connected to plastic pipe and the other end thereof should only be connected to metal pipe, requiring the user to make an effort to be certain of the orientation of the coupler or run the risk of a faulty joint. Some of the mechanical couplers have been designed as universal fittings, meaning that they could be used to join any combination of metal and plastic pipes. However, it is difficult to field form a mechanically coupled joint with the same degree of strength and integrity which can be achieved in a factory formed joint. Some factory made transition fittings have been designed with a plastic end and a metal end which can be butt welded to a plastic pipe and a metal pipe, respectively. However, the butt fusion welding of the plastic end to the plastic pipe results in a shortening of the combined length. While this may not be a problem where the metal pipe or the plastic pipe is readily moveable, it can represent a serious problem where both the plastic pipe and the metal pipe are restrained and the fitting has been cut to exactly fit the gap between the free end of the plastic pipe and the free end of the metal pipe. The resulting gap between the metal end of the transition fitting and the free end of the metal pipe may be too great& to permit a satisfactory butt weld, thereby necessitating additional coupling means.

SUMMARY OF THE INVENTION

It is an object of this invention to provide a new and improved transition fitting for coupling plastic pipe to metal pipe. It is an object of the invention to provide a preformed transition fitting which makes the proper orientation of the fitting readily obvious to the user without any additional effort on the part of the user. It is an object of the invention to provide a transition fitting which permits welding of the fitting to plastic pipe and metal pipe. Another object of the invention is to eliminate the problem of length shortening when the fitting is butt fusion welded to a plastic pipe. A further object of the invention is to provide stronger joinder of plastic pipe to metal pipe than is frequently achievable in joinders formed in field environments. Another object of the invention is to provide a low cost, high integrity transition fitting. This invention overcomes the foregoing difficulties and achieves the foregoing objects by providing a preformed coupling of a plastic tube and a tubular metal sleeve, with the metal sleeve being sized to telescope over the free end of the metal pipe to be joined and the plastic tube being sized for butt welding to the free end of the plastic pipe to be joined, after which the free end of the metal sleeve can be welded to the adjacent surface of the metal pipe. The preformed coupling can be provided with suitable retention means to resist any retraction of the plastic tube from the coupling.

Other objects, aspects, and advantages of the invention will be apparent from the drawings and the following description of the invention.

BRIEF DESCRIPTION OF THE DRAWINGS

FIG. 4 is a view, partly in cross-section, of the transition fitting being telescoped over a metal pipe;

FIG. 5 is a view, partly in cross-section, of the fitting after it has been butt fusion welded to the plastic pipe;

FIG. 6 is a view, partly in cross-section, of the fitting after it has been welded to both the plastic pipe and the metal pipe.

DETAILED DESCRIPTION

Figure 1:
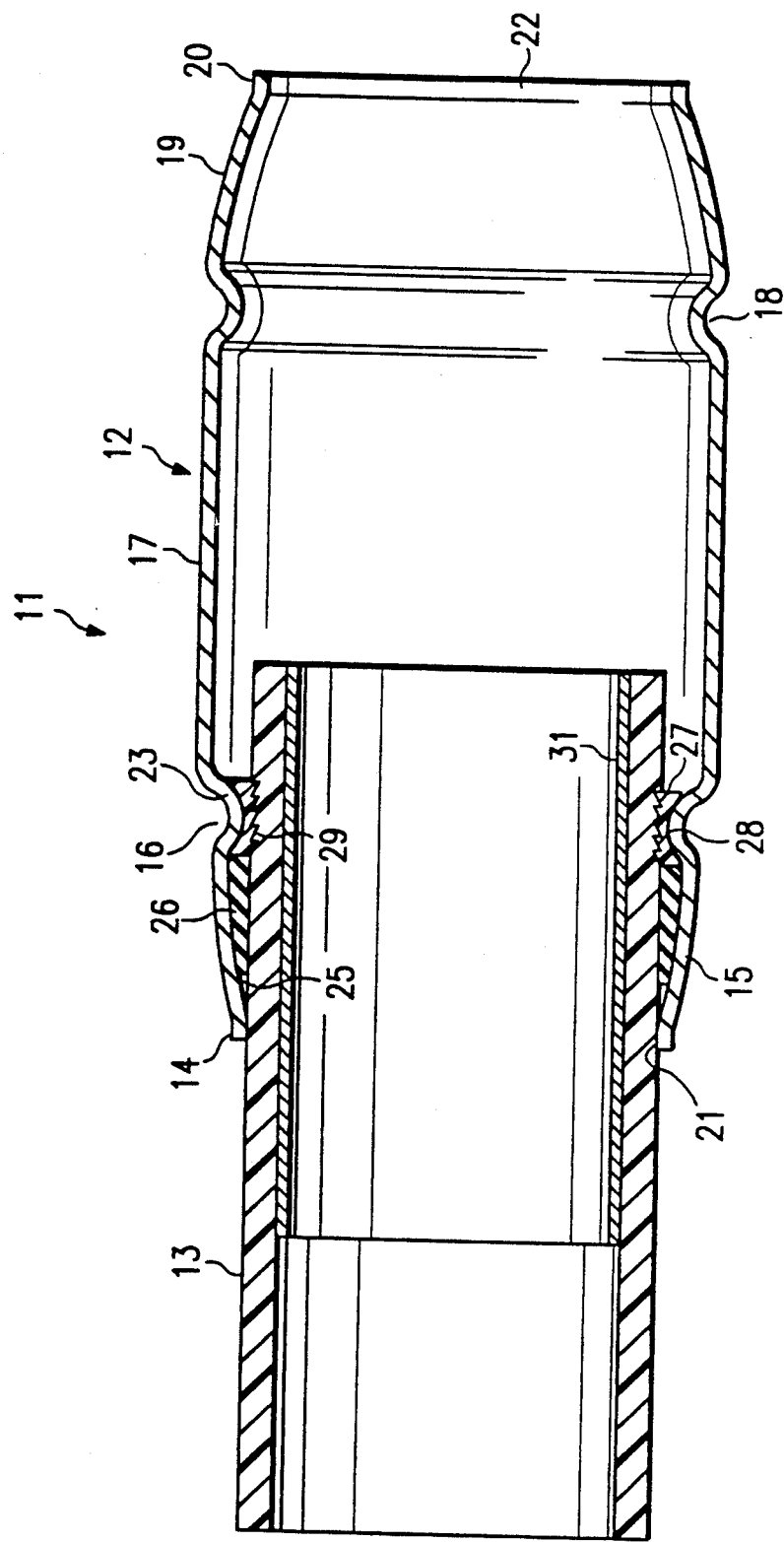
FIG. 1 is a cross-sectional view along the longitudinal axis of a transition fitting in accordance with one embodiment of the invention.

Referring now to FIG. 1, the preformed transition fitting 11 comprises a metal tubular sleeve 12 and a plastic cylindrical tube 13. The metal sleeve 12 is a single annular wall of substantially uniform wall thickness formed to have a plurality of annular sections or segments 14–20 extending seriatim along the longitudinal axis of the sleeve 12. Substantially cylindrical annular end segments 14 and 20 form the first and second open ends 21 and 22, respectively, of metal sleeve 12. Substantially cylindrical annular end segment 14 has an internal diameter which at most only slightly exceeds, and can be slightly less than, the normal outside diameter of the plastic tube 13. End segment 14 has a cylindrical inner surface with length along the longitudinal axis sufficient to provide significant mechanical contact between end segment 14 and plastic tube 13. Substantially cylindrical annular end segment 20 has an internal diameter slightly greater than the outside diameter of the metal pipe to be connected. Generally cylindrical annular central segment 17 has an internal diameter substantially greater than the outside diameter of the metal pipe to be joined, to permit the portion of sleeve 12 formed by frustoconical segment 19 and cylindrical end segment 20 to be telescoped over the free end of the metal pipe at an acute angle to the longitudinal axis of the metal pipe until the free end of the plastic pipe is cleared and the fitting can be aligned at least substantially coaxially with both the plastic pipe and the metal pipe to be joined.

The internal diameter of generally frustoconical segment 15 increases from a value at its longitudinally outer end at least substantially equal to the internal diameter of cylindrical end segment 14 to a value at its longitudinally inner end which is substantially equal to the inside diameter of central sleeve segment 17. Frustoconical segment 15 is joined to central segment 17 by curved section 16. Section 16 is concavely curved inwardly, with respect to the longitudinal axis of sleeve 12, about its periphery to form an annular shoulder convex 23 in the inner surface of sleeve 12.

The internal diameter of generally frustoconical segment 19 increases from a value at its longitudinally outer end equal to the internal diameter of cylindrical end segment 20 to a value at its longitudinally inner end which is substantially equal to the inside diameter of central sleeve segment 17. Frustoconical segment 19 is joined to central segment 17 by curved section 18. Section 18 is concavely curved inwardly, with respect to the longitudinal axis of sleeve 12, to provide a mechanical stiffening of this portion of sleeve 12.

Plastic tube 13 extends longitudinally through the outer end opening 21 of the metal sleeve 12 such that the inner end portion of the plastic tube 13 is positioned inside generally frustoconical annular sleeve segment 15 in at least substantially coaxial relationship therewith, thereby forming an annular recess 25 between the interior surface of frustoconical sleeve segment 15 and the adjacent exterior surface of plastic tube 13. An annular gasket 26 is positioned in annular recess 25 in sealing contact with the exterior surface of plastic tube 13 and the interior surface of frustoconical annular sleeve segment 15.

A split annular lock ring 27 of the type disclosed in U.S. Pat. No. 4,466,640, (the disclosure of which is incorporated herein by reference) is positioned between the shoulder 23 and the adjacent portion of plastic tube 13. The radially outer annular face of ring 27 has an annular concave channel 28 formed therein which conforms generally to the contour of shoulder 23. The radially inner face of annular ring 27 has a plurality of wedge or chisel shaped teeth 29 which are forced radially into the exterior surface of plastic tube 13. The external diameter of each of the inner and outer ends (viewed along the longitudinal axis of fitting 11) of ring 27 is greater than the minimum internal diameter of section 16. This fit of shoulder 23 and ring 27, and &he mechanical engagement of teeth 29 and plastic sleeve 13 provide a strong resistance to any force which would pull plastic tube 13 axially out of metal sleeve 12. This resistance to separation of tube 13 and sleeve 12 can be further enhanced by the coaxial insertion of a stiffening cylindrical sleeve 31 into the interior of plastic tube 13. Sleeve 31 is preferably made of metal and has an external diameter which may be slightly less, equal to, or slightly greater than the normal internal diameter of tube 13 before the fitting is compression formed. After the forming operation a mechanical engagement exists between stiffening sleeve 31 and tube 13. Sleeve 31 preferably extends from adjacent the longitudinally inner end of plastic tube 13 to a point which is exterior of metal sleeve 12. This provides for a stiffening of plastic tube 13 in the areas of cylindrical end segment 14, frustoconical segment 15 and gasket 26, and annular shoulder 23 and lock ring 27.

Figure 2:
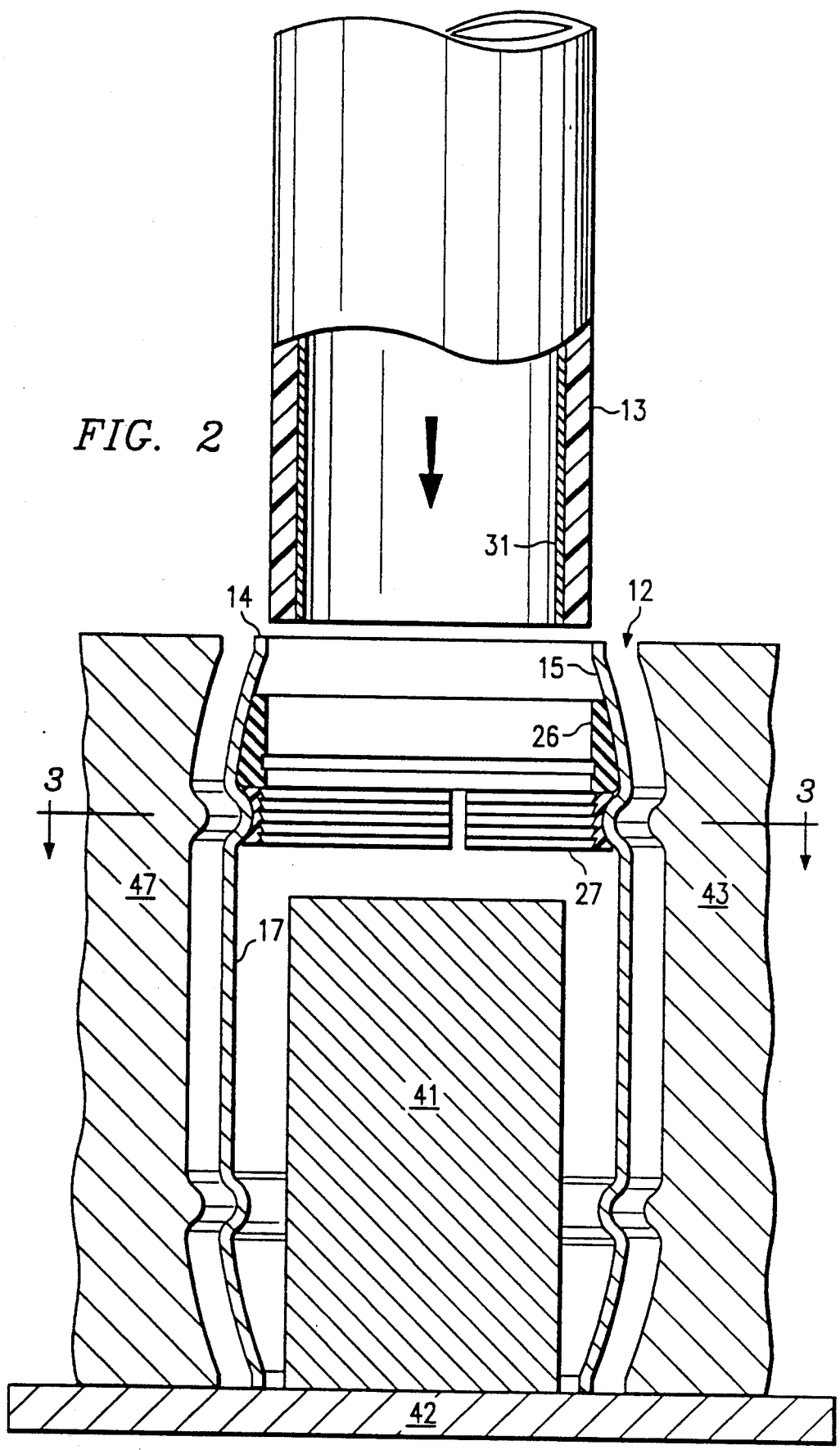
FIG. 2 is a fragmentary cross-sectional view of an apparatus for forming the fitting of FIG. 1.
Figure 3:
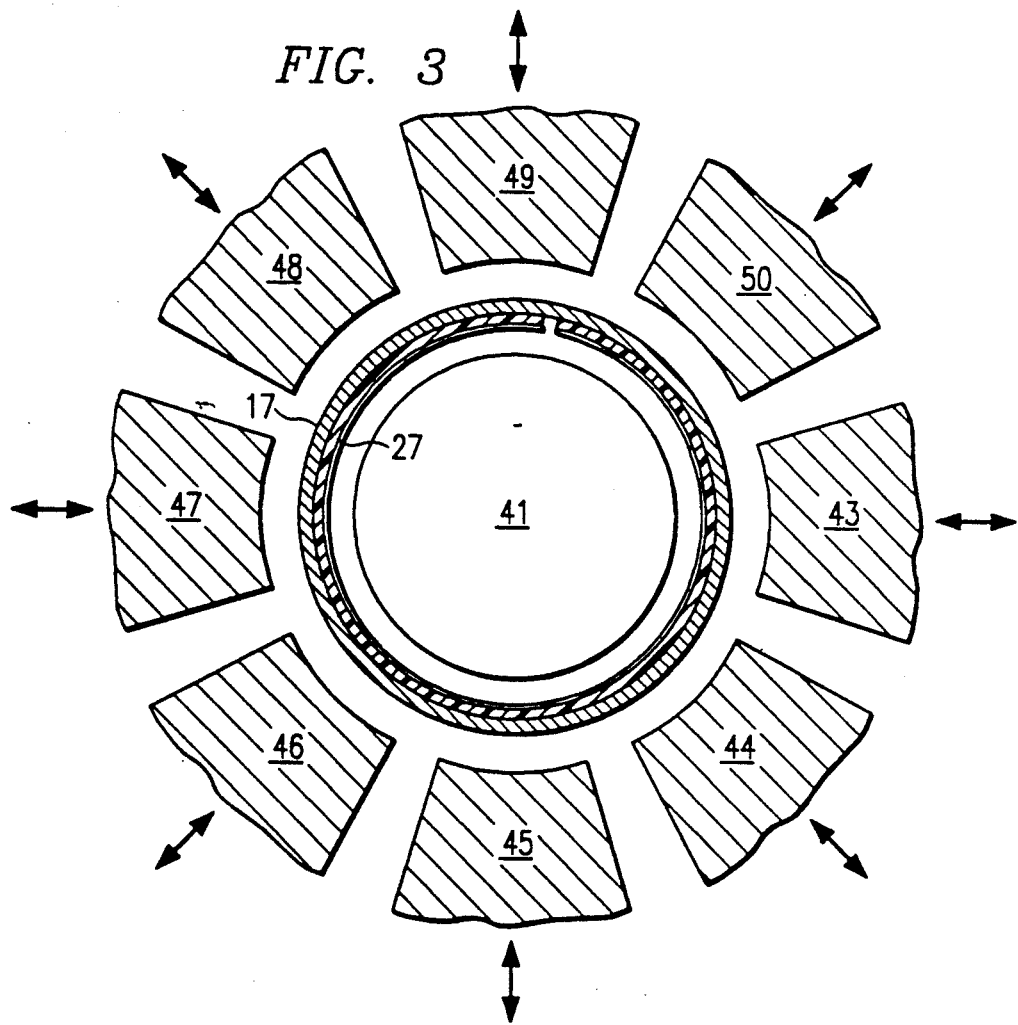
FIG. 3 is a cross-sectional view taken along line 3—3 in FIG. 2.

Referring also to FIGS. 2 and 3, the transition fitting 11 is fabricated in a factory by first placing split ring 27 inside metal sleeve 12 such that ring 27 encompasses and engages shoulder 23. Gasket 26 is then inserted into engagement with the frustoconical segment 15. Sleeve 12 containing ring 27 and gasket 26 is then placed over mandrel 41 positioned on support table 42. In this position, sleeve 12 is surrounded by a plurality of ram actuated molding elements 43-50. While eight molding elements have been illustrated, any suitable number can be employed. However, it is preferred that the molding elements be of sufficient number to provide essentially continuous contact around the periphery of sleeve 12 when the elements are fully in the inner, compression position. The molding surface of each of elements 43-50, which is closest to metal sleeve 12, is configured to substantially conform to sleeve 12 with the primary exceptions that the molding surfaces are recessed in the area of central segment 17 so that in the molding operation there is no contact between the molding elements 43-50 and central segment 17, and the molding surfaces have smaller radii than the other corresponding segments of metal sleeve 12.

Plastic tube 13, containing reinforcing sleeve 31, is inserted coaxially through the open end 21 of metal sleeve 12, the central opening of gasket 26 and the central opening of ring 27 until the end of plastic tube 13 comes to rest upon the upper end of mandrel 41. At this point the molding elements 43-50 are simultaneously actuated to cause the molding surfaces of elements 43-50 to move radially inwardly to contact segments 14, 15, 16, 18, 19 and 20 and to permanently reduce the diameter of each of these segments. Cylindrical end segment 14 is compressed until the internal surface thereof comes into very close proximity to or actual contact with plastic tube 13. Frustoconical segment 15 is compressed to provide a sealing engagement between frustoconical segment 15, gasket 26 and plastic tube 13. The annular curved segment 16 is compressed radially inwardly about its periphery to provide a mechanical engagement of shoulder 23, ring 27, and plastic tube 13. After the compression step is completed, molding elements 43-50 are retracted and the completed transition fitting 11 is removed from the forming machine.

FIGS. 4 through 6 illustrate the utilization of preformed fitting 11 to join an essentially cylindrical free end of a steel pipe 61 and an essentially cylindrical free end of a plastic pipe 62. In FIG. 4, the free end of sleeve 12, containing frustoconical segment 19 and end segment 20, is telescoped over the free end of steel pipe 61 to a sufficient extent that the free end of plastic tube 13 clears the free end of plastic pipe 62. At this point, the fitting 11 is moved longitudinally into abutting relationship with the free end of plastic pipe 62. Plastic tube 13 is then butt fusion welded to plastic pipe 62, resulting in a butt weld bead 63, as shown in FIG. 5, and a slight reduction in the overall combined length of pipe 62 and fitting 11. However, metal sleeve 12 has a sufficient length such that after plastic tube 13 is butt fusion welded to plastic pipe 62, frustoconical segment 19 and end segment 20 of metal sleeve 12 still surround the free end of metal pipe 61. The joining operation is then completed by applying a fillet weld 64 between the longitudinally outer end of cylindrical segment 20 and the adjacent exterior surface of metal pipe 61.

Figure 7:
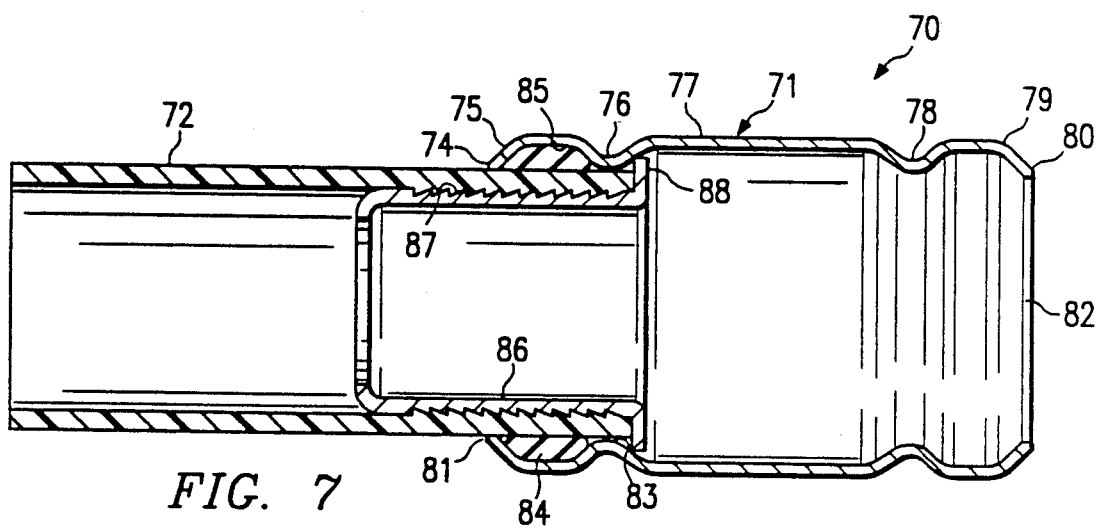
FIG. 7 is a cross-sectional view of a transition fitting in accordance with another embodiment of the invention.

Referring now to FIG. 7, the preformed transition fitting 70 according to a second embodiment of the invention comprises a tubular metal sleeve 71 and a cylindrical plastic tube 72. The metal sleeve 71 is a single annular wall of substantially uniform wall thickness formed to have a plurality of annular segments 74–80 extending seriatim along the longitudinal axis of the metal sleeve 71. Substantially cylindrical annular end segments 74 and 80 form the first and second open ends 81 and 82 of the metal sleeve 71. Frustoconical segment 75 and plastic tube 72 form an annular recess 85 in which annular gasket 84 is positioned to provide a sealing engagement between plastic tube 72 and metal sleeve 71. Stiffening cylinder 86 is coaxially positioned within the inner end of plastic tube 72. Teeth 87 on the exterior cylindrical surface of sleeve 86 mechanically engage the interior surface of plastic tube 72 when sleeve 71 is compressed during the forming operation. Annular flange 88 extends radially outwardly from the longitudinally inner end of sleeve 86. The outer diameter of flange 88 is greater than the minimum internal diameter of shoulder 83 formed by radially inwardly directed segment 76. Teeth 87 on sleeve 86 resist the separation of plastic tube 72 from sleeve 86. Flange 88 engages shoulder 83 to resist any movement of tube 72 out of sleeve 71.

While the presently preferred embodiments of the invention have been illustrated, other embodiments are also contemplated, e.g. one or both of cylindrical end segments 14 and 20 can be omitted, stiffening segment 18 can be omitted, and/or additional gaskets can be provided. Other reasonable variations and modifications to the invention are possible with the scope of the foregoing disclosure and the appended claims to the invention.

I claim:

1. A preformed transition fitting suitable for field connection of one essentially cylindrical end of a plastic pipe and one essentially cylindrical end of a metal pipe, which comprises:

a metal sleeve formed solely by a single annular wall, having a generally cylindrical central annular sleeve segment having first and second longitudinal ends, a first generally frustoconical annular sleeve segment having a longitudinally inner end and a longitudinally outer end with the outer end forming a first outer end opening of smaller internal diameter than the internal diameter of the inner end of said first generally frustoconical annular sleeve segment, a second generally frustoconical annular sleeve segment having a longitudinally inner end and a longitudinally outer end with the outer end of said second generally frustoconical annular sleeve segment forming a second outer end opening of smaller internal diameter than the internal diameter of the inner end of said second generally frustoconical annular sleeve segment such that said second generally frustoconical annular sleeve segment can be telescoped over said essentially cylindrical end of said metal pipe and permit welding of the thus telescoped end of said metal sleeve to said metal pipe, and an annular shoulder segment joined to the first end of said generally cylindrical central sleeve segment and to the inner end of said first generally frustoconical annular sleeve segment, said annular shoulder segment being inwardly directed about its periphery to form an annular shoulder on the inside of said metal sleeve;

a relatively short length of generally cylindrical plastic tube having first and second end portions and extending through said first outer end opening of said metal sleeve such that said second end portion of said plastic tube is positioned inside said first generally frustoconical annular sleeve segment in at least substantially coaxial relationship therewith while said first portion of said plastic tube is outside of said metal sleeve for bonding to said essentially cylindrical end of a plastic pipe, thereby forming an annular recess between the interior surface of said first generally frustoconical annular sleeve segment and the adjacent exterior surface of said plastic tube, the external diameter of said plastic tube being substantially as great as the internal diameter of said first outer end opening;

an annular gasket positioned in said annular recess in sealing contact with the exterior surface of said plastic tube and the interior surface of said first generally frustoconical annular sleeve segment; and an annular retention element positioned in engagement with said annular shoulder and said second end portion of said plastic tube to retain said second end portion of said plastic tube within said metal sleeve.

2. A preformed transition fitting according to claim 1 wherein said metal sleeve further comprises a first generally cylindrical annular sleeve end segment joined to said outer end of said first generally frustoconical annular sleeve segment to form said first end of said metal sleeve, the internal diameter of said first generally cylindrical annular sleeve end segment being equal to the inner diameter of said first outer end opening.

3. A preformed transition fitting according to claim 2 wherein said metal sleeve further comprises a second generally cylindrical annular sleeve end segment joined to said outer end of said second generally frustoconical annular sleeve segment to form said second end of said metal sleeve, the internal diameter of said second generally cylindrical annular sleeve end segment being equal to the inner diameter of said second outer end opening.

4. A preformed transition fitting according to claim 3 wherein said metal sleeve further comprises an annular stiffening segment joined to the second end of said generally cylindrical central sleeve segment and to the inner end of said second generally frustoconical sleeve segment, said stiffening segment being inwardly directed about its periphery to form a stiffening rib.

5. A preformed transition fitting according to claim 4 further comprising a cylindrical stiffening sleeve, having a longitudinally inner end and a longitudinally outer end, positioned coaxially inside of said second end portion of said plastic tube in mechanical engagement with the interior surface of said second end portion of said plastic tube with said inner end of said stiffening sleeve being within said metal sleeve and said outer end of said stiffening sleeve being outside of said metal sleeve.

6. A preformed transition fitting according to claim 5 wherein said annular retention element comprises an annular flange extending radially outwardly from said inner end of said stiffening sleeve, the outer diameter of said annular flange being greater than the minimum internal diameter of said annular shoulder.

7. A preformed transition fitting according to claim 5 wherein said stiffening sleeve has a series of teeth on its outer cylindrical surface to increase resistance to axial movement of said plastic tube longitudinally outwardly with respect to said stiffening sleeve.

8. A preformed transition fitting according to claim 5 wherein said annular retention element comprises an annular lock ring positioned between and in engagement with said annular shoulder and the exterior surface of said second end portion of said plastic tube.

9. A preformed transition fitting according to claim 8 wherein said annular shoulder segment is in radially inwardly directed compression against said annular lock ring.

10. A preformed transition fitting according to claim 9 wherein said annular lock ring has a radially inner annular face and a radially outer annular face, said outer annular face having a radial recess about its outer periphery which contains said annular shoulder, said inner annular face having a plurality of radially inwardly directed teeth which mechanically grip the outer surface of said second end portion of said plastic tube.

11. A preformed transition fitting according to claim 1 further comprising a cylindrical stiffening sleeve, having a longitudinally inner end and a longitudinally outer end, positioned coaxially inside of said second end portion of said plastic tube in mechanical engagement with the interior surface of said second end portion of said plastic tube with said inner end of said stiffening sleeve being within said metal sleeve and said outer end of said stiffening sleeve being outside of said metal sleeve.

12. A preformed transition fitting according to claim 11 wherein said annular retention element comprises an annular flange extending radially outwardly from said inner end of said stiffening sleeve, the outer diameter of said annular flange being greater than the minimum internal diameter of said annular shoulder.

13. A preformed transition fitting according to claim 11 wherein said annular retention element comprises an annular lock ring positioned between and in engagement with said annular shoulder and the exterior surface of said second end portion of said plastic tube.

14. A preformed transition fitting according to claim 13 wherein said annular lock ring has a radially inner annular face and a radially outer annular face, said outer annular face having a radial recess about its outer periphery which contains said annular shoulder, said inner annular face having a plurality of radially inwardly directed teeth which mechanically grip the outer surface of said second end portion of said plastic tube.

15. A method of joining one essentially cylindrical free end of a plastic pipe and one essentially cylindrical free end of a metal pipe which comprises,
positioning a preformed transition fitting according to claim 1 with the second generally frustoconical annular sleeve segment thereof telescoped over said free end of said metal pipe,
butting the first end portion of said plastic tube against said free end of said plastic pipe while leaving at least a portion of said metal sleeve telescoped over said free end of said metal pipe and bonding the thus abutted said first end portion of said plastic tube and said free end of said plastic pipe, and
then bonding the second end of said metal sleeve to the outer surface of said metal pipe.

16. A method according to claim 15 wherein the bonding of said first end portion of said plastic tube and said free end of plastic pipe is accomplished by butt welding, and wherein the bonding of said second end of said metal sleeve to the outer surface of said metal pipe is accomplished by fillet welding.

17. A method of joining one essentially cylindrical free end of a plastic pipe and one essentially cylindrical free end of a metal pipe which comprises,
positioning a preformed transition fitting according to claim 10 with the second generally frustoconical annular sleeve segment thereof telescoped over said free end of said metal pipe,
butting the first end portion of said plastic tube against said free end of said plastic pipe while leaving at least a portion of said metal sleeve telescoped over said free end of said metal pipe and bonding the thus abutted said first end portion of said plastic tube and said free end of said plastic pipe, and
then bonding the second end of said metal sleeve to the outer surface of said metal pipe.

18. A method according o claim 17 wherein the bonding of said first end portion of said plastic tube and said free end of plastic pipe is accomplished by butt welding, and wherein the bonding of said second end of said metal sleeve to the outer surface of said metal pipe is accomplished by fillet welding.

19. A method of joining one essentially cylindrical free end of a plastic pipe and one essentially cylindrical free end of a metal pipe which comprises,
positioning a preformed transition fitting according to claim 7 with the second generally frustoconical annular sleeve segment thereof telescoped over said free end of said metal pipe,
butting the first end portion of said plastic tube against said free end of said plastic pipe while leaving at least a portion of said metal sleeve telescoped over said free end of said metal pipe and bonding the thus abutted said first end portion of said plastic tube and said free end of said plastic pipe, and
then bonding the second end of said metal sleeve to the outer surface of said metal pipe.

20. A method according to claim 19 wherein the bonding of said first end portion of said plastic tube and said free end of plastic pipe is accomplished by butt welding, and wherein the bonding of said second end of said metal sleeve to the outer surface of said metal pipe is accomplished by fillet welding.

* * * * *